United States Patent
Jansing et al.

(10) Patent No.: US 8,361,557 B2
(45) Date of Patent: Jan. 29, 2013

(54) SOLVENT-CONTAINING PIGMENTED COATING COMPOSITIONS AND USE THEREOF FOR PRODUCING MULTICOAT PAINT SYSTEMS AND PROCESS FOR IMPROVING THE FLOP OF EFFECT PAINT SYSTEMS

(75) Inventors: Frank Jansing, Tauberbischof-sheim (DE); Egon Wegner, Greven (DE); Norbert Low, Neustadt/Aisch (DE)

(73) Assignee: BASF Coatings GmbH, Munster (DE)

( * ) Notice: Subject to any disclaimer, the term of this patent is extended or adjusted under 35 U.S.C. 154(b) by 739 days.

(21) Appl. No.: 12/515,104

(22) PCT Filed: Sep. 22, 2007

(86) PCT No.: PCT/EP2007/008262
§ 371 (c)(1),
(2), (4) Date: May 15, 2009

(87) PCT Pub. No.: WO2008/058590
PCT Pub. Date: May 22, 2008

(65) Prior Publication Data
US 2010/0047462 A1 Feb. 25, 2010

(30) Foreign Application Priority Data
Nov. 15, 2006 (DE) .......................... 10 2006 053 776

(51) Int. Cl.
*B05D 3/06* (2006.01)
*B05D 3/10* (2006.01)
(52) U.S. Cl. ...................... 427/387; 427/384; 427/385.5; 427/397.7
(58) Field of Classification Search .................. 427/384, 427/385.5, 387, 397.7
See application file for complete search history.

(56) References Cited

U.S. PATENT DOCUMENTS

| | | | |
|---|---|---|---|
| 3,674,838 A | 7/1972 | Nordstrom | |
| 4,126,747 A | 11/1978 | Cowherd, III et al. | |
| 4,279,833 A | 7/1981 | Culbertson et al. | |
| 4,340,497 A | 7/1982 | Knopf | |
| 4,522,958 A | 6/1985 | Das et al. | |
| 4,677,004 A | 6/1987 | Das et al. | |
| 4,680,204 A | 7/1987 | Das et al. | |
| 5,652,470 A | 7/1997 | von der Heide et al. | |
| 6,770,373 B1 | 8/2004 | Kinoshita et al. | |

FOREIGN PATENT DOCUMENTS

| | | |
|---|---|---|
| DE | 10129899 A1 | 1/2003 |
| EP | 0228003 B1 | 4/1990 |
| EP | 0574417 B1 | 12/1993 |
| EP | 0480959 B1 | 9/1994 |
| EP | 0687715 A2 | 12/1995 |
| EP | 0787159 B1 | 8/1997 |
| EP | 1185568 B1 | 4/2000 |
| EP | 1173491 B1 | 2/2002 |
| EP | 1204701 B1 | 9/2005 |
| WO | WO96/24619 A1 | 8/1996 |
| WO | WO99/42529 A1 | 8/1999 |
| WO | WO99/42531 A1 | 8/1999 |
| WO | WO01/25307 A1 | 10/2000 |
| WO | WO01/72909 A2 | 10/2001 |
| WO | WO03/089477 A1 | 10/2003 |
| WO | WO03/089487 A1 | 10/2003 |

OTHER PUBLICATIONS

International Search Report for PCT/EP2007/008262 dated Feb. 12, 2008.
Written Opinion for PCT/EP2007/008262 filed on Sep. 22, 2007.
International Preliminary Report on Patentability for PCT/EP2007/008262 dated Jun. 10, 2009.

*Primary Examiner* — Gregory DelCotto
(74) *Attorney, Agent, or Firm* — Cantor Colburn LLP

(57) ABSTRACT

Disclosed are pigmented coating compositions comprising at least one inorganic particle (N) having a primary particle size of 1 to 800 nm, at least one binder (B), at least one color and/or effect pigment (D), and one or more organic solvents (E), and at least one wax or one waxlike compound (W), wherein the inorganic particles (N) are at least partly modified with a stabilizer (S) which has groups (S1) which are able to interact with the surface of the inorganic particles (N), and one or more hydrophobic substructures. Also disclosed are processes for producing multicoat paint systems and also to the use thereof and also processes for enhancing the flop of multicoat paint systems by using the pigmented coating compositions.

18 Claims, No Drawings

SOLVENT-CONTAINING PIGMENTED COATING COMPOSITIONS AND USE THEREOF FOR PRODUCING MULTICOAT PAINT SYSTEMS AND PROCESS FOR IMPROVING THE FLOP OF EFFECT PAINT SYSTEMS

CROSS REFERENCE TO RELATED APPLICATIONS

This application is a National Phase Application of Patent Application PCT/EP2007/008262 filed on 22 Sep. 2007, which claims priority to DE102006053776.9, filed 15 Nov. 2006, both of which are hereby incorporated by reference.

FIELD OF INVENTION

The present invention relates to solventborne pigmented coating compositions and to their use for producing multicoat paint systems.

The present invention also relates to a method of enhancing the flop of effect paint systems, especially multicoat paint systems.

BACKGROUND ART

The long-established solventborne coating materials, particularly the basecoat materials, and the single-coat or multicoat color and/or effect paint systems produced using them, exhibit very good performance properties.

The continually growing technical and esthetic requirements of the market, however, and particularly the requirements made by the automakers and their customers, are necessitating continual onward development beyond the technical and esthetic level achieved to date.

In particular there is a need to provide new coating compositions which make it possible to produce basecoat systems which exhibit a particularly strongly pronounced light/dark behavior (metallic flop). At the same time, however, the advantages achieved by means of the known basecoat materials and the basecoat systems produced from them should not be lost, but should be retained at least to the same extent and preferably to a greater extent.

For reasons of environmental protection it is necessary, furthermore, to provide coating compositions having an ever-lower solvent content and thus an ever-higher solids content. Typically, however, reducing the solvent content leads to an impairment in particular in the optical properties of the resulting paint system, and particularly to an impairment of the flop.

The literature therefore recommends adding cellulose acetobutyrates and/or additives which fix aluminum pigments, such as wax dispersions, for example, to the coating compositions when increasing the solids content, in order to enhance the flop. However, this can lead to the appearance of visual defects, such as sanding marks, for example. Moreover, when using coating compositions having a high solids content at spray viscosity to give coatings which exhibit a particularly pronounced metallic flop, it is necessary to add distinctly high quantities of wax dispersion to the coating compositions. This leads in turn, however, to what is called mud cracking, in other words the formation of cracks in the pigmented basecoat film.

U.S. Pat. No. 4,522,958 has disclosed solventborne basecoat materials having a high solids content and containing inorganic particles with a particle size of 1 to 150 nm. These inorganic particles are modified on their surface with chemically bonded, carbon-containing molecules, thereby making the inorganic particles substantially hydrophobic and organophilic. Use is made in particular of organosols, in which the particles are in dispersion in an alcoholic medium. Also described, however, as well are inorganic particles where the surface of the silica has been modified with alkylchlorosilanes in order to render the particles compatible with the organic solvent. In the pigmented coating compositions, these modified inorganic particles are said by U.S. Pat. No. 4,522,958 to lead to an improvement in the metallic effect, without detracting from the gloss or storage stability of the resulting coatings.

Apart from the modified inorganic particles, the coating compositions described in U.S. Pat. No. 4,522,958 may also comprise typical binders, crosslinking agents if desired, organic solvents, pigments, and typical auxiliaries and additives, such as catalysts, flow control agents, surface-active substances, microparticles, and the like.

A disadvantage associated with the coating compositions known from U.S. Pat. No. 4,522,958, however, is that the resulting coatings either have an adequate flop but an insufficient haze and leveling, or have an adequate haze but an insufficient flop. Moreover, the coating compositions known from U.S. Pat. No. 4,522,958 often have an adhesion to the clearcoat that is in need of improvement. Finally, the use of the large quantities of inorganic particles that are needed to improve the flop leads in general, after the coating compositions have been stored, to an increase in their viscosity, meaning that in order to set the required spray viscosity it is necessary to add further solvent—precisely what was supposed to be avoided.

Additionally, U.S. Pat. No. 4,677,004, U.S. Pat. No. 5,652,470, and U.S. Pat. No. 4,680,204 disclose solventborne base coat materials which have a high solids content and comprise inorganic particles having a particle size of 1 to 150 nm. These inorganic particles may where appropriate have been surface-modified in order to enhance their compatibility with the film-forming resins or with the solvent. For that purpose the particles are dispersed in an alcoholic medium or a polyalcohol and at least part of the surface of the inorganic particles is modified with this alcohol or polyalcohol. As a result of the addition of the inorganic particles, the resultant basecoat materials exhibit, in particular, improved sagging behavior on nonhorizontal faces and also an improved resistance to insipient dissolution by the clearcoat (strike-in). Moreover, the addition of the inorganic particles is said to improve the metallic effect.

These basecoats known from U.S. Pat. No. 4,677,004, U.S. Pat. No. 5,652,470, and U.S. Pat. No. 4,680,204, however, have insufficient stability on storage and frequently exhibit formation of gel specks. Moreover, the resulting coatings combine an adequate flop with an insufficient haze and leveling, or an adequate haze with an insufficient flop.

Furthermore, EP-B-1 204 701 discloses cured coatings which have an improved scratch resistance and comprise at least one surface-active agent and a multiplicity of particles, the concentration of the particles within a surface region of the coating being greater than a concentration of the particles within one volume region of the coating. The coatings may also be pigmented. However, EP-B-1 204 701 does not describe how the metallic flop of pigmented coatings can be enhanced.

Finally, DE-A-101 29 899 discloses solventborne, pigmented coating compositions which as well as binders and pigments include as an essential constituent at least one colorless, transparent or opaque powder which is substantially inert toward the other constituents and has an average particle size of 1.0 to 10.0 µm, its particles having a density of 0.8 to 3.6 g cm$^{-3}$, and which as a result lead to coatings featuring significantly reduced clouding.

These coating compositions described in DE-A-101 29 899, however, have a decidedly high fraction of organic solvents, which is increasingly undesirable on environmental grounds. Also in need of improvement is the metallic flop of the resulting coatings.

But DE-A-101 29 899 does not contain any information as to how the metallic flop of the base coats can be enhanced with the basecoats at the same time having a very good overall visual appearance and being free from film defects, such as from cracking in the basecoat on subsequent clearcoating, for example.

The coating compositions described in DE-A-101 29 899 may additionally include, as an additive, nanoparticles, especially hydrophilic nanoparticles, having a primary particle size of less than 50 nm. Details concerning whether the nanoparticles must be modified or for which purpose they are used, however, are absent from DE-A-101 29 899.

The problem on which the present invention is based is therefore that of providing pigmented coating compositions which allow the production of basecoats exhibiting a particularly strongly pronounced light/dark behavior (metallic flop). This should in particular be ensured even in the case of coating compositions having a relatively high solids content at spray viscosity. At the same time, however, the advantages achieved by the known basecoat materials and the basecoats produced from them should not be lost, but should instead be retained at least to the same extent and preferably to a greater extent.

The corresponding color and/or effect basecoats ought therefore to exhibit in particular a good haze, i.e. no haze, effective leveling, and a very good overall visual appearance. Furthermore, the basecoats ought to be free from film defects, such as cracking (mud cracking), light/dark shadowing (clouds), and gel specks. Moreover, the resultant coatings ought not to exhibit any optical defects, such as sanding marks, for example, and ought to exhibit satisfactory adhesion to the clearcoat.

In addition, the coating compositions ought to exhibit effective stability on storage—that is, on storage of the coating compositions at 40° C. for 28 days there ought to be no significant deterioration in the properties either of the coating compositions or of the coatings produced from these stored coating compositions. Thus there should be no deterioration in the rheological properties of the coating compositions, particularly no increase in viscosity, nor any gel-speck formation, and there should be no impairment of the flop.

Finally, a method ought to be made available for enhancing the metallic flop of effect paint systems, especially multicoat paint systems.

SUMMARY

This object is achieved, surprisingly, by a pigmented coating composition (P) comprising (N) one or more inorganic particles (N) which have a particle size of 1 to 800 nm, preferably of 3 to 250 nm, and more preferably of 4 to 100 nm, (B) one or more binders (B), (D) one or more pigments, (E) one or more organic solvents (E), and (V) if desired, one or more crosslinking agents (V), the inorganic particles (N) being at least partly modified with a stabilizer (S) which has at least one group (S1) which is able to interact with the surface of the inorganic particles (N), and one or more hydrophobic substructures, wherein the coating composition (P) further comprises at least one wax and/or at least one waxlike compound (W).

The present invention additionally provides a process for producing the paint systems using these pigmented coating compositions, and the use of the paint systems.

Finally, the invention also provides a method of enhancing the metallic flop of effect paint systems, especially multicoat paint systems.

It is surprising and was not foreseeable that through the inventive use of the combination of (I) one or more inorganic particles (N) modified at least partly with the stabilizer (S) and (II) at least one wax and/or at least one waxlike compound (W) it would be possible to provide pigmented coating compositions which, even with a high solids content at spray viscosity, exhibit very good flop, without loss of the advantages achieved by the known basecoat materials and the basecoats produced from them, these advantages instead being retained to the same extent and, preferably, to a greater extent.

The multicoat paint systems of the invention therefore also have a good haze, i.e., no haze, effective leveling, and a very good overall visual appearance. Furthermore, the basecoats are free from film defects, such as cracking (mud cracking), light/dark shadowing (clouds), and gel specks, and they do not show any sanding marks.

Moreover, the coating compositions have a good stability on storage, i.e., when stored at 40° C. for 28 days show no significant deterioration in the properties either of the coating compositions or of the coatings produced from these stored coating compositions; in particular, they do not exhibit any deterioration in the rheological properties of the coating compositions, and there is no impairment to the flop of the resulting coatings.

Finally, the multicoat paint systems of the invention meet the requirements typically imposed on an automobile coating—that is, in particular, they exhibit the requisite clearcoat adhesion.

DETAILED DESCRIPTION OF THE INVENTION

Pigmented Coating Composition (P)

Inorganic Particles (N)

The pigmented coating compositions comprise as a constituent essential to the invention one or more inorganic particles (N) having a particle size of 1 to 800 nm, preferably of 3 to 250 nm, more preferably of 4 to 100 nm. This particle size refers in general to the size of the dispersed particles (N) before incorporation into the coating composition (P).

The inorganic particle or particles (N) preferably have a primary particle size of 3 to 200 nm, in particular of 3 to 30 nm.

The inorganic particles (N) used in the coating compositions of the invention are typically substantially colorless, in order in particular not to affect the shade of the coating composition.

The inorganic particles (N) may be present as separate particles or in the form of agglomerates, although it is preferred to use separate particles. In particular the inorganic particles (N) should above all be capable of easy and stable incorporation into the pigmented coating composition, in order to ensure the desired use of the pigmented coating composition. The inorganic particles (N) should therefore either remain stably dispersed over a relatively long time (in the field of automobile finishing, for example, over a period of up to 12 months when stored at temperatures of up to 30° C.) or else should be readily redispersible with conventional means of paint mixing, such as with the aid of stirrers, for example.

Preference is given to using inorganic particles (N) which have a density of 0.8 to 4.5 g cm$^3$.

The inorganic particles (N) are typically selected from the group of the compounds of main-group and transition-group metals, preferably of the metals from main groups three to five, transition groups three to six and also transition groups one and two of the Periodic Table of the Elements, and also the lanthanides, especially compounds of boron, aluminum, gallium, silicon, barium, germanium, tin, arsenic, antimony, silver, zinc, titanium, zirconium, hafnium, vanadium, niobium, tantalum, molybdenum, tungsten, and cerium, especially aluminum, silicon, barium, silver, cerium, titanium, and zirconium.

The compounds of the metals are preferably the oxides, oxide hydrates, sulfates or phosphates.

Suitable inorganic particles (N) are preferably selected from the group consisting of hydrophilic and hydrophobic, especially hydrophilic, particles based on silica, alumina, zinc oxide, zirconium oxide, barium sulfate, and the polyacids and heteropolyacids of transition metals, preferably of molybdenum and tungsten. Particular preference is given to using particles based on silica and/or alumina, especially fumed or colloidal silica.

Very particular preference is given to using hydrophilic fumed silicas whose agglomerates and aggregates have a catenated structure, preparable by the flame hydrolysis of silicon tetrachloride in an oxyhydrogen flame. These silicas are sold by the company Degussa under the brand name Aerosil®, for example.

Also useful as inorganic particles (N), however, are sols, especially organosols. Sols of this kind are described for example in U.S. Pat. No. 4,522,958, column 7, line 26 to column 11, line 14. Desiring of particular mention here are sols based on silica in which the inorganic particles are formed in situ and are modified with the stabilizer (S) during and/or after their formation. The particles may be prepared by means of a multiplicity of different techniques known to the skilled worker.

In accordance with the invention it is of advantage if the inorganic particles (N) are incorporated in the form of pastes. Further advantages result if the paste resins or dispersing resins used are the binders (B) described below that are present in the coating material of the invention. As paste resins or dispersing resins for the particles (N) use is made in particular of the same binders also used for dispersing the pigments.

The particles (N) are used preferably in an amount of 0.2% to 2.0% by weight, more preferably of 0.5 to 1.5% by weight, based in each case on the total weight of the pigmented coating composition and based on the solids content of the this component (N) without the stabilizer (S).

Stabilizer (S)

It is essential to the invention that the inorganic particles (N) are at least partly modified with a stabilizer (S) which comprises at least one group (S1) which is able to interact with the surface of the inorganic particles (N), and one or more hydrophobic substructures.

The stabilizer (S) is able to interact with the inorganic particles (N) by way of the groups (S1). In this context it is possible for the stabilizer to interact with the inorganic particles only by way of physical forces, although it is also possible for there to be, at least in part, a chemical reaction between the groups (S1) and the functional groups located typically on the surface of the inorganic particles. Thus, in particular, the hydrophilic inorganic particles have hydroxyl groups on their surface (in the form of SiOH groups in the case of the SiO$_2$ types, for example), which are able to interact not only chemically but also physically, such as via hydrogen bonds, for example, with the groups (S1).

The groups (S1) of the stabilizer are preferably selected from the group of hydroxyl, carboxyl, ether, phosphate, phosphonate, bisphosphonate, sulfate or sulfonate groups or nitrogen-containing hydrophilic groups or mixtures thereof. Particularly preferred stabilizers (S) are those containing not only hydroxyl but also carboxyl groups. Additionally of particular preference are stabilizers (S) which contain not only hydroxyl groups but also carboxyl groups and ether groups. Stablizers (S) employed in particular are those having a hydroxyl number of 10 to 150 mg KOH/g and an acid number of 2 to 50 mg KOH/g, based in each case on the solids of the stabilizer (S).

Furthermore, it is essential to the invention that the stabilizer (S) also has one or more hydrophobic substructures. These hydrophobic radicals can interact with the organic constituents of the coating composition, in particular with the solvent, with the binders, and with the compound (W).

The stabilizer (S) may therefore contain, in particular, one or more organic radicals (R1) containing the hydrophobic substructures. Moreover, the organic radical or radicals (R1) may where appropriate also have hydrophilic substructures, and/or the groups (S1) may be attached, at least partly, or completely, to these organic radicals (R1).

It is preferred for the hydrophobic substructures of the stabilizer (S) to be selected at least in part from the group of alkyl or alkenyl groups, especially alkyl or alkenyl groups having 5 to 50 C atoms.

Particularly preferred hydrophobic substructures used are the radicals of saturated and/or unsaturated fatty acids, especially of saturated and/or unsaturated fatty acids having 5 to 30 carbon atoms in the molecule, such as, for example, radicals of valeric acid, caproic acid, enanthic acid, caprylic acid, pelargonic acid, capric acid, undecylic acid, lauric acid, myristic acid, palmitic acid, stearic acid, oleic acid, elaidic acid, arachidic acid, behenic acid, lignoceric acid, cerotic acid, melissic acid, linoleic acid, ricinene acid, ricinoleic acid, linolenic acid, arachidonic acid, clupanodonic acid, alpha-eleostearic acid, alpha-licanic acid, alpha-parinaric acid, ricinoleic acid and Isanol acid, and mixtures of these fatty acids, and/or the corresponding hydroxy acids of said fatty acids, or mixtures thereof.

Very particular preference is given to using stabilizers which comprise radicals of hydroxyvaleric acid, hydroxycaproic acid, hydroxystearic acid, hydroxylauric acid, ricinoleic acid or mixtures thereof.

Also suitable, furthermore, are the corresponding radicals of dimer and trimer fatty acids and also mixtures thereof and the radicals of the corresponding mixtures of the dimer and/or trimer fatty acids with the stated fatty acids.

Very particular preference is given to using as stabilizer (S) esters of said (hydroxy) fatty acids/dimer fatty acids/trimer fatty acids, particularly esters with polyalkylene glycols, more preferably esters with polyalkylene glycols having 6 to 20 C atoms, such as diethylene glycol, triethylene glycol, tetraethylene glycol, dipropylene glycol, tripropylene glycol, and mixtures thereof. Mention may be made here in particular of esters of hydroxyvaleric acid, hydroxycaproic acid, and hydroxystearic acid with triethylene glycol, tetraethylene glycol, and mixtures of these hydroxyl compounds, of these esters, and mixtures of these esters with the acids.

Examples of suitable stabilizers (S) also include the corresponding commercially customary compounds, provided they have the requisite structure. Suitable examples thereof include those in commerce under the name Solsperse® from Avecia GmbH, especially Solsperse® 39000, Dispers® from Th. Goldschmidt, especially Dispers® 652, and corresponding additives from Degussa.

The stabilizer (S) is used typically in an amount of 3.0% to 40.0%, in particular of 5.0 to 20.0%, with very particular preference of 8.0% to 12.0%, by weight, based in each case on the weight of the particles (N) employed and based in each case on the solids content of the stabilizer (S) and of the particles (N).

One of the assurances provided by the modification of the inorganic particles (N) with the stabilizer (S) is that even on storage at 40° C. for 28 days there will be no significant deterioration in the properties either of the coating compositions or of the coatings produced from these stored coating compositions; in particular, there will be no deterioration in the rheological properties of the coating compositions, and no impairment to the flop of the resulting coatings.

Compound (W)

It is also essential to the invention that the pigmented coating compositions further comprise one or more waxes and/or one or more waxlike compounds (W).

In connection with the present invention the terms "wax" and "waxlike compounds" refer to all natural and synthetically obtained substances which have the following properties:

1. Kneadable at 20° C., solid to brittley hard.
2. Coarsely to finely crystalline, transparent to opaque, but not glasslike.
3. Melting without decomposition above 40° C.
4. Of relatively low viscosity even a little above the melting point.
5. Highly temperature-dependent in consistency and solubility.
6. Polishable under gentle pressure.

If a substance fails to exhibit more than one of these properties, it is no longer a "wax" for the purposes of this invention (cf. Ullmanns Enzyklöpadie der technischen Chemie; 4th, revised and expanded edition; Verlag Chemie; Weinheim; Deerfield Beach, Fla.; Basle, 1983, page 3).

The waxes or waxlike compounds (W) may be modified and/or unmodified. All typical waxes known per se are suitable, although it is preferred to use synthetic waxes.

Examples of natural waxes are plant waxes, such as carnauba wax, candelilla wax, esparto wax, guaruma wax, japan wax, cork wax, montan wax, ouricury wax, rice germ oil wax, sugar cane wax, animal waxes, such as beeswax, uropygial gland oil, wool wax, shellac wax, spermaceti, and mineral waxes, such as ceresin and ozokerite.

Examples of chemically modified waxes are hydrogenated jojoba waxes, montan ester waxes, and Sasol waxes.

Also suitable, for example, are modified and unmodified polyolefin waxes, such as polyethylene and polypropylene waxes, polyethylene glycol waxes, and polyamide waxes. Additionally suitable, too, are polyacrylate polymers and polyacrylate copolymers which like wax exhibit a pronounced temperature dependency in their solubility in organic solvents.

The waxes or the polyacrylate polymers and polyacrylate copolymers commonly have a number-average molecular weight of between 300 and 20 000, preferably between 1000 and 10 000, and have drop points preferably between 70 and 180° C.

The polyethylene and polypropylene waxes are either homopolymers or copolymers having typically 0.5% to 40% by weight of comonomer units originating from saturated or unsaturated monocarboxylic acids or their amides or esters. Examples of such comonomer units include the radicals of acrylic acid, methacrylic acid, maleic acid, fumaric acid, acrylamide, stearic acid or stearamide, or vinyl acetate. The polyolefin waxes are available commercially under diverse designations.

Suitable polyamide waxes include all polyamide waxes typically employed in coating compositions, examples being fatty acid-containing polyamide waxes which are available commercially, for example, under the Disparlon name.

Also suitable are waxlike polysiloxanes, such as polydimethylsiloxanes, polydiphenylsiloxanes or modified silicones, such as polyester-modified, polyether-modified, and acrylate-modified silicones.

The compound (W) is used preferably in an amount of 0.2% to 2.0% by weight, more preferably of 0.5% to 1.5% by weight, based in each case on the total weight of the pigmented coating composition and based on the cellulose content of this component (W).

Advantageous pigmented coating compositions are obtained in particular if the particles (N) and the compound(s) (W) are used in amounts such that the total amount of inorganic particles (N) plus wax and/or waxlike compound (W) is from 0.4% to 4.0%, more preferably from 1.0% to 3.0%, by weight, based in each case on the total weight of the pigmented coating composition and based on the solids content of this component (W) and of the particles (N) without stabilizer.

Advantageously the total amount of inorganic particles (N) plus wax and/or waxlike compound (W) is tailored to the amount of coloring pigments minus the amount of metallic pigments. The less the extent to which the coating composition (P) contains coloring pigments, the higher the total amount of inorganic particles (N) plus wax and/or waxlike compound (W), since the flop becomes more important, in general, as the coloring-pigment content falls. In the case of coating compositions (P) which contain no metallic or effect pigments, use is likewise made of the inventive combination of inorganic particles (N) plus wax and/or waxlike compound (W), which in that case has a particular stabilizing effect, although in general here smaller overall amounts of inorganic particles (N) plus wax and/or waxlike compound (W) are sufficient.

Pigments

The coating composition (P) further comprises at least one pigment. The pigment is preferably selected from the group consisting of organic and inorganic color, effect, color and effect, magnetically shielding, electrically conductive, anticorrosion, fluorescent, and phosphorescent pigments. Preference is given to using the color and/or effect pigments.

With particular preference the pigmented coating composition comprises at least one effect pigment, in particular at least one metal flake pigment. Together with the effect pigment or pigments the pigmented coating composition additionally comprises, if desired, at least one or more color pigments.

Examples of suitable effect pigments, which may also be coloring, are metal flake pigments, such as commercially customary aluminum bronzes and stainless-steel bronzes, and nonmetallic effect pigments, such as pearlescent and interference pigments, for example, plated-shaped effect pigments based on iron oxide, or liquid-crystalline effect pigments. For further details refer to Römpp Lexikon Lacke und Druckfarben, Georg Thieme Verlag, 1998, page 176, "Effect pigments", and pages 380 and 381, "Metal oxide-micropigments" to "Metal pigments".

Use is made in particular of commercially customary aluminum bronzes. The types used include both untreated types, available commercially under the name Stapa® Metallux from Eckart, for example, and treated types, especially silanized types, which are described for example in WO 01/81483 and are available commercially under the name Hydrolan® from Eckart, for example.

It is advantageous in this context that through the inventive use of the combination of the stabilized inorganic particles (N) and the wax or waxlike compound (W) it is possible to achieve coatings having a very good flop even at high solids content and even without the use of special aluminum pigments, in other words even when using the standard types.

The metal flake pigment preferably has a thickness of 200 to 2000 nm and in particular 500 to 1500 nm.

The metal flake pigment preferably has an average particle size of 10 to 50 and in particular 13 to 25 µm.

Suitable organic and/or inorganic color pigments are the pigments used typically in the paint industry. Use may also be made of corresponding dyes.

The pigment content of the coating composition (P) may vary very widely and is guided primarily by the depth of the color and/or the intensity of the effect that are to be set, and also by the dispersibility of the pigments in the coating compositions (P). In the case of solid-color topcoats the pigment content, based in each case on the solids content of the coating composition (P), is preferably 0.5% to 70%, more preferably 1.0% to 60% by weight. In the case of metallic coating materials, based in each case on the solids content of the coating composition (P), the pigment content is preferably 0.5% to 40%, more preferably 0.5% to 35%, with particular preference 1% to 30% by weight.

Amount of Inorganic Particles (N) in Relation to the Amount of Compound (W)

Pigmented coating compositions having a particularly good profile of properties are obtained if the weight ratio of the inorganic particles (N) without stabilizer (S) to the compound (W), based in each case on the solids content of these components (N) and (W), is between 30:70 and 70:30, preferably between 40:60 and 60:40, and very preferably 50:50.

Particularly if the coating compositions include a low level of coloring pigments, as in the case of silvery hues, for example, the fraction of inorganic particles (N) chosen is advantageously higher, since this is beneficial to the propensity toward sanding marks. Correspondingly, particularly when the coating compositions include a high level of coloring pigments, the fraction of wax or waxlike compound (W) chosen is higher.

Binder (B)

The coating composition (P) of the invention may be physically curing.

For the purposes of the present invention the term "physical curing" denotes the curing of a layer of a coating composition by filming as a result of loss of solvent from the coating composition, with linking within the coating taking place via looping of the polymer molecules of the binders (regarding the term, cf. Römpp Lexikon Lacke und Druckfarben, Georg Thieme Verlag, Stuttgart, N.Y., 1998, "Binders", pages 73 and 74). Or else filming takes place by way of the coalescence of binder particles (cf. Römpp Lexikon Lacke und Druckfarben, Georg Thieme Verlag, Stuttgart, N.Y., 1998, "Curing", pages 274 and 275). Typically no crosslinking agents are required for this purpose. The physical curing may where appropriate be assisted by atmospheric oxygen, by heat or by exposure to actinic radiation.

The coating composition of the invention may be thermally curable. In that case it may be self-crosslinking or externally crosslinking.

For the purposes of the present invention the term "self-crosslinking" identifies the capacity of a binder to enter into crosslinking reactions with itself. A prerequisite for this is that the binders already include both kinds of complementary reactive functional groups which are needed for crosslinking, or else the binder contains reactive functional groups which are able to react "with themselves". Externally crosslinking coating compositions, in contrast, are those in which one kind of the complementary reactive functional groups are present in the binder, and the other kind are present in a crosslinking agent. For further details refer to Römpp Lexikon Lacke und Druckfarben, Georg Thieme Verlag, Stuttgart, N.Y., 1998, "Curing", pages 274 to 276, particularly page 275, bottom.

Suitable binders (B) are the binders typically employed in basecoat materials in the automobile industry sector, with the selection of the nature and amount of the synthesis components used to prepare these binders being used, in a manner familiar to the skilled worker, to control the properties and hence the suitability of the binders for the coating composition of the invention.

It is preferred to employ binders (B) containing thiol, hydroxyl, N-me-thylolamino-, N-alkoxymethylamino, imino, carbamate, allophanate and/or carboxyl groups, preferably hydroxyl or carboxyl groups, on the one hand, and to employ crosslinking agents (V) containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked and non-blocked isocyanate, urethane or alkoxymethylamino groups, on the other.

In the case of self-crosslinking coating materials of the invention the binders contain, in particular, methylol, methylol ether and/or N-alkoxy-methylamino groups.

Complementary reactive functional groups which are especially suitable for use in the coating materials of the invention are hydroxyl groups on the one hand and blocked or non-blocked isocyanate, urethane or alkoxymethylamino groups on the other.

The functionality of the binders (B) with respect to the above-described reactive functional groups may vary very widely and is guided in particular by the target crosslinking density and/or by the functionality of the crosslinking agents (V) employed in each case. In the case of hydroxyl-containing binders (B), for example, the OH number is preferably 15 to 300, more preferably 20 to 250, with particular preference 25 to 200, very preferably 30 to 150, and in particular 35 to 120 mg KOH/g. Preferably, moreover, the binders have an acid number of 5 to 50 mg KOH/g, in particular 15 to 35 mg KOH/g.

The above-described complementary functional groups can be incorporated into the binders (B) in accordance with the customary and known methods of polymer chemistry. This can be done, for example, by the incorporation of monomers which carry corresponding reactive functional groups, and/or by means of polymer-analogous reactions.

Suitable binders (B) generally have a number-average molecular weight of 400 to 5000 g/mol.

The binders (B) are preferably used in an amount of 15% to 60%, in particular of 20% to 40%, by weight, based in each case on the solids content of the coating composition (P) and based on the solids of the binder (B).

Examples of suitable binders (B) include random, alternating and/or block, linear and/or branched and/or comb (co) polymers of ethylenically unsaturated monomers, or polyaddition resins and/or polycondensation resins. For further details of these terms refer to Römpp Lexikon Lacke und Druckfarben, Georg Thieme Verlag, Stuttgart, N.Y., 1998, page 457, "Polyaddition" and "Polyaddition resins (polyadducts)" and pages 463 and 464, "Polycondensates", "Polycondensations", and "Polycondensation resins", and also pages 73 and 74, "Binders".

Examples of suitable (co)polymers (B) are (meth)acrylate (co)polymers or partially saponified polyvinyl esters, especially (meth)acrylate copolymers.

Examples of suitable polyaddition resins and/or polycondensation resins (B) are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyesters.

Of these binders (B) the (meth)acrylate (co)polymers and the polyesters, especially the (meth)acrylate (co)polymers, have particular advantages and are therefore used with particular preference.

Suitable polyester resins may be saturated or unsaturated, especially saturated, and are described for example in EP-B-787 159, page 4, lines 26 to 53.

Suitable acrylate resins (B) can be prepared by methods known to the skilled worker using olefinically unsaturated monomers containing reactive functional groups, where appropriate in combination with monomers without reactive functional groups.

Examples of suitable olefinically unsaturated monomers containing reactive functional groups are m1) monomers which carry at least one hydroxyl, amino, alkoxy-methylamino, carbamate, allophanate or imino group per molecule, such as hydroxyalkyl esters of acrylic acid, methacrylic acid or another alpha,beta-olefinically unsaturated carboxylic acid, which derive from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl-, 3-hydroxypropyl, 3-hydroxybutyl, 4-hydroxybutyl acrylate, methacrylate, ethacrylate, crotonate, maleinate, fumarate or itaconate; or hydroxycycloalkyl esters such as 1,4-bis(hydroxy-methyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 C atoms per molecule, in particular a Versatic® acid, or, instead of the reaction product, an equivalent amount of acrylic and/or methacrylic acid, which is then reacted, during or after the polymerization reaction, with the glycidyl ester of an alpha-branched monocarboxylic acid having 5 to 18 C atoms per molecule, in particular a Versatic® acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)aminopropyl acrylate or methacrylate;

(meth)acrylamides, such as (meth)acrylamide, N-methyl-, N-methylol-, N,N-dimethylol-, N-methoxymethyl-, N,N-di(methoxy-methyl)-, N-ethoxymethyl- and/or N,N-di(ethoxyethyl)-(meth)-acrylamide;

acryloyloxy- or methacryloyloxy-ethyl, -propyl or -butyl carbamate or allophanate; further examples of suitable monomers containing carbamate groups are described in U.S. Pat. No. 3,479,328, U.S. Pat. No. 3,674,838, U.S. Pat. No. 4,126,747, U.S. Pat. No. 4,279,833 or U.S. Pat. No. 4,340,497;

m2) monomers which carry at least one acid group per molecule, such as acrylic acid, beta-carboxyethyl acrylate, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers).

m3) monomers containing epoxide groups, such as the glycidyl ester of acrylic acid, methacrylic acid, ethacrylic acid, crotonic acid, maleic acid, fumaric acid or itaconic acid, or allyl glycidyl ether.

Higher polyfunctional monomers of the above-described type are used generally in minor amounts. For the purposes of the present invention, minor amounts of higher polyfunctional monomers mean those amounts which do not lead to crosslinking or gelling of the copolymers (B), particularly of the meth(acrylate) copolymers (B).

Examples of suitable olefinically unsaturated monomers (m4) without reactive functional groups include alkyl esters of acrylic acid, methacrylic acid or another alpha,beta-olefinically unsaturated carboxylic acid, vinylaromatic compounds, and mixtures of these monomers.

Also suitable as binders are polyurethane resins. The polyurethane resins are obtained in a manner known to the skilled worker by reacting at least one polyol selected from the group consisting of polyester polyols and polyether polyols, preferably having a number-average molecular weight of 400 to 5000, and at least one polyisocyanate and also if desired, at least one compound containing at least one isocyanate-reactive functional group and at least one (potentially) anionically group in the molecule if desired, at least one further compound containing at least one isocyanate-reactive functional group, and if desired, at least one compound having a number-average molecular weight of 60 to 600 daltons, containing hydroxyl and/or amino groups in the molecule.

Polyurethane resins of this kind are described for example in EP-B-228 003 and EP-B-574 417.

Polyurethane resins of this kind are obtained for example by using as the isocyanate component isocyanates that are typically employed in the paint industry sector, such as hexamethylene diisocyanate, octamethylene diisocyanate, decamethylene diisocyanate, do-decamethylene diisocyanate, tetradecamethylene diisocyanate, trimethyl-hexane diisocyanate, tetramethylhexane diisocyanate, isophorone diisocyanate, 2-isocyanatopropylcyclohexyl isocyanate, dicyclohexyl-methane 2,4'-diisocyanate, dicyclohexyl-methane 4,4'-diisocyanate, 1,4- or 1,3-bis(isocyanatomethyl)cyclohexane, 1,4- or 1,3- or 1,2-diiso-cyanatocyclohexane, 2,4- or 2,6-diisocyanato-1-methylcyclohexane, diisocyanates derived from dimer fatty acids, of the kind sold under the name DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane or tetramethylxylylene diisocyanates (TMXDI) or mixtures of these polyisocyanates, preferably tetramethyl-xylylene diisocyanates (TMXDI) and/or isophorone diisocyanate, preferably isophorone diisocyanate.

As chain extenders with hydroxyl and/or amino groups it is preferred to use trimethylolpropane and diethanolamine.

Together or instead of the stated polyurethane resins, suitable binders in the pigmented coating compositions also include what are known as acrylated polyurethane resins, which are obtainable in a manner familiar to the skilled worker by polymerization of ethylenically unsaturated monomers in the presence of a polyurethane resin. In this context it is possible to use polyurethane resins without double bonds and/or polyurethane resins with double bonds.

As binders (B) it is also possible to use acrylated polyurethane resins having pendant and/or terminal double bonds, in particular having pendant and/or terminal ethenylarylene groups.

The acrylated polyurethane resins having pendant and/or terminal double bonds can be obtained by reacting a polyurethane prepolymer (I-1) containing at least one free isocyanate group with a compound (I-2) which has at least one ethylenically unsaturated double bond and one NCO-reactive group, in particular a hydroxyl group or an amino group.

The acrylated polyurethane resins having pendant and/or terminal double bonds can also be obtained by reacting a polyurethane prepolymer (II-1) containing at least one NCO-reactive group, in particular at least one hydroxyl group or one amino group, with a compound (II-2) which has at least one ethylenically unsaturated double bond and one free isocyanate group.

Also used as binders (B) are graft copolymers obtainable by polymerizing olefinically unsaturated monomers in the presence of the acrylated polyurethane resins having pendant and/or terminal double bonds.

Use is made in particular of graft copolymers which comprise a hydrophobic core of at least one copolymerized olefinically unsaturated monomer and a hydrophilic shell of at least one hydrophilic acrylated polyurethane. Also suitable, however, are graft copolymers which comprise a hydrophobic core of at least one hydrophobic acrylated polyurethane and a hydrophilic shell of at least one copolymerized olefinically unsaturated monomer.

Suitable acrylated polyurethane resins and graft copolymers prepared from them are described for example in WO 01/25307, page 5, line 14, to page 45, line 4, and in EP-B-787 159, page 2, line 27, to page 7, line 13.

The polyurethane resins described can be used where appropriate in combination with one or more polyacrylate resins and/or with one or more polyester resins.

Polymer Microparticles (M)

Polymer microparticles as well are used advantageously in the coating compositions (P) of the invention. Suitable polymer microparticles are described for example in EP-A-480 959, page 3, line 36 to page 4, line 35, and in WO 96/24619, WO 99/42529, EP-B-1 173 491, EP-B-1 185 568, WO 03/089487, WO 03/089477, WO 01/72909, and WO 99/42531. The polymer microparticles may be used in particular to control the flow, the evaporation behavior, and the attitude toward incipient dissolution by the clearcoat.

Suitable polymer microparticles typically have a number-average molecular weight of 2000 to 100 000.

Suitable polymer microparticles also typically have an average particle size of 0.01 to 10 µm, in particular of 0.01 to 5 µm, and very preferably of 0.02 to 2 µm.

Polymer microparticles used with particular preference contain reactive functional groups which are able to react with the functional groups of the crosslinker. In particular the polymer microparticles have hydroxyl groups. The polymer microparticles in this case preferably have a hydroxyl number of 5 to 150 mg KOH/g. Polymer microparticles containing hydroxyl groups are described for example in WO 01/72909.

Crosslinked polymer microparticles are obtainable, for example, by polymerizing a mixture of
  (a) an ethylenically unsaturated monomer which contains one ethylenically unsaturated group per molecule, or a mixture of such monomers, and
  (b) an ethylenically unsaturated monomer that contains at least two ethylenically unsaturated groups per molecule, or a mixture of such monomers,
in an aqueous phase in the presence if desired of emulsifiers or if desired in the presence of a carrier resin, and then transferring the aqueous polymer microparticle dispersion thus obtained to an organic solvent or a mixture of organic solvents.

Preference is given to polymer microparticles prepared using components containing ionic and/or polar groups, preferably hydroxyl groups and/or carboxyl groups. Components (a) and (b) ought in general to contain between 1% and 20%, preferably between 3% to 15%, by weight of ionic and/or polar groups.

In order to obtain sufficiently crosslinked polymer microparticles it is generally sufficient to use 0.25 to 1.2 mol, preferably 0.3 to 1 mol, of component (b) per mole of component (a).

The polymer microparticles (M) used in the coating compositions (P) of the invention may alternatively be prepared directly in organic phase.

Polymer microparticles used with preference are obtainable, for example, by subjecting a mixture of
  (c) an ethylenically unsaturated monomer (mi) containing at least one reactive group (G1) per molecule, or a mixture of such monomers (mi), and
  (d) if desired, an ethylenically unsaturated monomer (mii) containing at least one non-(G1) reactive group (G2) per molecule, or a mixture of such monomers (mii), and
  (e) if desired, a further ethylenically unsaturated monomer (miii) or a mixture of such monomers (miii)
to polymerization in an organic solvent, in the presence where appropriate of a carrier resin.

Examples of suitable monomers (mi) are monomers which contain hydroxyl groups, carbamate groups, amino groups, alkoxymethylamino groups, allophanate groups or imino groups, especially hydroxyl groups.

The monomers (mi) containing the reactive groups (G1) can also be prepared by reacting two compounds, of which one compound (a) contains a reactive group (a) and at least one ethylenically unsaturated double bond, and the other compound (b) contains a group (b) which is reactive with the groups (a), and contains, if desired, at least one ethylenically unsaturated double bond.

Suitable monomers (mii) are, for example, monomers containing carboxyl groups.

Suitable monomers (miii) are the so-called neutral monomers that are typically used, in other words ethylenically unsaturated monomers containing no reactive groups.

Examples of suitable monomers (mi) to (miii) are the monomers (m1) to (m3) already recited in connection with the description of the binders.

In the coating compositions of the invention the polymer microparticles (M) are used typically in an amount of 3% to 25%, in particular of 10% to 20%, by weight, based in each case on the solids content of the coating composition (P) and the solids content of the polymer microparticles (M).

Particularly preferred coating compositions (P) are obtained if the coating compositions comprise the inorganic particles (N), the wax or waxlike compound (W), and the polymer microparticles (M) in an amount such that the ratio of
- (I) the amount of inorganic particles (N) plus wax or waxlike compound (W) to
- (II) the amount of polymer microparticles (M)

is between 1.0:1.0 to 1.0:6.0, more preferably between 1.0:2.0 to 1.0:4.0, based in each case on the solids content of the coating composition (P), the solids content of the component (N) without the stabilizer (S), the solids content of the wax or waxlike compound (W), and the solids content of the polymer microparticles (M).

Organic Solvents (E)

The amount of solvent (E) in the coating composition (P) is generally 30% to 70%, preferably 38% to 65% by weight, based in each case on the total weight of the coating composition (P).

Through the inventive combination of (I) at least one inorganic particle (N) at least partly modified with the stabilizer (S), and (II) at least one wax and/or at least one waxlike compound (W), surprisingly, pigmented coatings are obtained which even at spray viscosity have a decidedly high solids content and lead to coatings having the good properties, particularly flop.

Preferred pigmented coating compositions (P) therefore have a viscosity at 23° C. of 16 s to 35 s, preferably 18 s to 25 s, efflux time in the Ford 3 Cup and a solids content of at least 35% by weight. In the present specification this is generally referred to as "spray viscosity".

Suitable solvents (E) are all solvents typically employed in the paint industry, examples being alcohols, glycol ethers, esters, ether esters and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butyl glycol, butyl glycol acetate, butanol, dipropylene glycol methyl ether, butyl glycolate, xylene, toluene, Shellsol® T, Pine Oil 90/95, Solventnaphtha®, Shellsol® A, Solvesso, benzine 135/180, and the like.

Crosslinking Agent (V)

The amount of crosslinking agent (V) in the coating composition (P) is generally up to 60% by weight, based in each case on the solids content of the coating composition (P) and on the solids of the crosslinking agent (V), in particular 11.5% to 60.0% by weight, preferably 20% to 50% by weight.

As crosslinking agent, used if appropriate, the pigmented coating compositions may contain free isocyanates or blocked isocyanates and/or amino resins.

Suitable isocyanate in this context encompasses in principle the isocyanates specified in connection with the description of the polyurethane resins suitable as binders (B), and typically employed in the paint industry sector, preferably TACT and dimethylpyrazole-blocked trimeric hexamethylene diisocyanate, and also, in the case of 2-component coating compositions, trimeric hexamethylene diisocyanate.

Suitable blocking agents include all blocking agents typically employed, such as the corresponding alcohols, amines, ketones, pyrazoles, etc., preferably blocking agents having a deblocking temperature less than 130° C.

Suitable in principle are the amino resins typically employed in the paint industry sector, it being possible to control the properties of the pigmented coating compositions by way of the reactivity of the amino resins. Preference is given to methanol- and/or butanol-etherified amino resins, examples being the products available commercially under the names Cymel®, Resimene®, Maprenal®, and Luwipal®, especially Maprenal® MF 900 and Resimene® 755.

Further Auxiliaries and Additives (Z)

As well as the components described above, the coating composition (P) may contain customary and known auxiliaries and additives (Z) in customary amounts, preferably 0% to 40%, in particular 0.5% to 30%, by weight, based on the total weight of the coating composition (P). Examples of suitable auxiliaries and additives are organic and inorganic fillers, such as talc, and/or further customary auxiliaries and additives, such as curing catalysts, light stabilizers, antioxidants, devolatilizers, wetting agents, emulsifiers, slip additives, polymerization inhibitors, reactive diluents, flow control agents, flame retardants, adhesion promoters, corrosion inhibitors, free-flow aids, siccatives, biocides, and the like.

Inventive Multicoat Paint Systems

Transparent Coating Composition (K)

All transparent coating compositions typically employed are suitable for producing the inventive multicoat paint system, such as, for example, typically employed aqueous or solventborne transparent coating compositions, which may be formulated either as one-component or as two-component or multicomponent coating compositions. Also suitable, furthermore, are powder slurry clearcoat materials. The transparent coating compositions employed may be curable thermally and/or by means of radiation, in particular by means of UV radiation.

The transparent coating compositions typically comprise at least one binder having functional groups and also at least one crosslinker having a functionality complementary to the functional groups of the binder. Examples of such complementary functionalities are, in particular, carboxyl/epoxy, amine or thiol or hydroxyl/blocked or free isocyanate or alkoxylated amino groups or transesterifiable groups, (meth)acryloyl/CH-acidic or amine or hydroxyl or thiol, carbamate/alkoxylated amino groups and (meth)acryloyl/(meth)acryloyl.

Use is made in particular of transparent coating compositions based on polyurethane resins and/or polyacrylate resins and/or polyester resins, preferably having hydroxyl, amino, carbamate, carboxyl, (meth)acryloyl and/or thiol groups, in combination with the corresponding crosslinkers, in particular in combination with isocyanates, amino resins, anhydrides, and the like.

Besides the binder and crosslinker, the transparent coating compositions comprise typical auxiliaries and additives, such as, for example, crosslinking catalysts, defoamers, adhesion promoters, additives for improving substrate wetting, additives for improving surface smoothness, matting agents, light stabilizers, preferably the above-described UV absorbers having an absorption maximum below 370 nm and/or HALS, corrosion inhibitors, biocides, flame retardants or polymerization inhibitors, as described in detail in the book "Lack-additive" [Additives for coatings] by Johan Bieleman, Wiley-VCH, Weinheim, N.Y., 1998.

Processes for Producing the Paint System

The paint system, especially multicoat paint system, of the invention can be applied to any desired substrates. The substrates may be constructed from any of a very wide variety of materials and combinations of materials. Preferably they are composed of metals, plastics, glass, wood, leather, textile, ceramic or natural stone, preferably of metals, plastics, and glass, in particular of metals and plastics.

The substrates typically carry a primer and, where appropriate, a surfacer, which are applied with the customary processes, such as electrodeposition coating, immersion, knifecoating, spraying, rolling or the like. Preferably the primer is at least partly or fully cured before the pigmented coating composition is applied. The curing of the primer and of the surfacer takes place typically by heating to a temperature between 80 and 170° C. for a time from 3 to 30 min.

The transparent coating composition (K) applied where appropriate is applied, like the pigmented coating composition (P), by means of typical methods of applying liquid coating compositions, such as dipping, knifecoating, spraying, rolling or the like, but in particular by means of spraying. Preference is given to employing spray application methods, such as, for example, compressed-air spraying, airless spraying, high-speed rotation, electrostatic spray application (ESTA), alone or in conjunction with hot spray application such as, for example, hot-air spraying. It is also possible to apply the pigmented coating composition in a first application by ESTA and in a second application pneumatically.

Where a transparent coating composition (K) is applied, the pigmented coating is briefly flashed off or briefly dried, generally at a temperature between 30 and less than 100° C., for a time from 1 to 15 min. After that the transparent coating composition is applied.

The applied pigmented film and the transparent film applied if desired are jointly cured thermally. Where the transparent coating composition (K) is also curable with actinic radiation as well, an aftercure takes place by exposure to actinic radiation.

Curing may take place after a certain rest time. This may have a duration of 30 seconds to 2 hours, preferably 1 minute to 1 hour, and in particular 1 to 45 minutes. The rest time serves, for example, for the flow and defertilization of the paint films or for the evaporation of volatile constituents. The rest time may be assisted and/or shortened by the application of elevated temperatures up to 90° C. and/or by a reduced air humidity <10 g water/kg air, provided this does not entail any damage or change to the paint films, such as their premature complete crosslinking, for instance.

Curing takes place typically at a temperature between 90 and 160° C. for a time from 15 to 90 min.

For the drying and/or conditioning of the wet pigmented coating and, where appropriate, of the wet transparent coating it is preferred to use thermal and/or convection methods, and it is possible to use customary and known devices, such as through-type ovens, radiant NIR and IR heaters, fans, and blowing tunnels. These devices may also be combined with one another.

In the multicoat paint systems of the invention, the pigmented coating generally has a dry film coat thickness of 3 to 40 µm, preferably of 5 to 30 µm, and in particular 7 to 20 µm, and—if present—the transparent coating (K) generally has a dry film coat thickness of 10 to 120 µm, preferably of 30 to 80 µm, in particular 40 to 70 µm.

Use of the Multicoat Paint System

The paint systems, especially multicoat paint systems, of the invention are used in particular in the field of automotive OEM finishing, but also in the field of utility-vehicle and automotive refinish, specifically for the coating of motor-vehicle bodies or interior or exterior bodywork components. They are also suitable, however, for other sectors, such as for the coating of components for marine construction and aircraft construction, or of components for household and electrical appliances or parts thereof, of moldings or films, of the interior and exterior of buildings; of furniture, windows, and doors, of small industrial parts, of coils, containers, and packaging, of optical, electrical, and mechanical components, and also articles of everyday use.

Method of Improving the Flop of Multicoat Effect Paint Systems

The present invention also provides a method of improving the flop of multicoat effect paint systems, for which I. a solventborne pigmented coating composition (P) is applied to a substrate, II. a film is formed from the coating composition applied in I), III. if desired, a transparent coating composition is applied to the film formed from I), and IV. the pigmented and, where appropriate, the transparent coating composition applied are baked either separately or together to give a cured film on the substrate, the pigmented coating composition comprising one or more inorganic particles (N) which have a particle size of 1 to 800 nm, preferably of 3 to 250 nm, and more preferably of 4 to 100 nm, the inorganic particles (N) being at least partly modified with a stabilizer (S) which has at least one group (S1) which is able to interact with the surface of the inorganic particles (N), and one or more organic hydrophobic substructures, wherein the coating composition further comprises at least one wax and/or one waxlike compound (W).

The resultant effect coatings and color and effect coatings of the invention, in particular the multicoat paint systems of the invention, preferably have a flop index $FL_{X\text{-}Rite}$>8 and more preferably >10, calculated in each case in accordance with the X-Rite company's formula:

$$FL_{X\text{-}Rite}=2.69(L^*_{15°}-L^*_{110°})^{1.11}/(L^*_{45°})^{0.86}.$$

EXAMPLES 1.1. Preparation of an Acrylate Binder (B)

A reactor is charged with 13.239 parts by weight of Solvesso 100 and this initial charge is heated to 167° C. (333° F.). The reactor is placed under a pressure of 0.35 bar (5 psi) and fed over a period of 4 h simultaneously with a monomer mixture consisting of 2.149 parts by weight of acrylic acid, 10.765 parts by weight of hydroxyethyl acrylate, 11.484 parts by weight of 2-ethylhexyl acrylate, 11.484 parts by weight of butyl acrylate and 14.353 parts by weight of styrene and with an initiator mixture composed of 0.719 parts by weight of di-tert-butyl peroxide and 11.120 parts by weight of a solution of dicumyl peroxide in Solvesso 100 (50% strength). Subsequently the reaction mixture is maintained for 1 h at the abovementioned temperature and pressure, before 21.530 parts by weight of epsilon-caprolactone are added over a period of 1 h. The reaction mixture is cooled to 150° C. (302° F.) and held for 1.5 h at a pressure of 0.35 bar (5 psi). It is cooled and adjusted with Solvesso 100 to a solids of 75%. The resulting acrylate resin has an acid number of 23 mg KOH/g and an OH number of 73 mg KOH/g, based in each case on the solids.

1.2. Preparation of a Carrier Resin 1

A reactor is charged with 5.762 parts by weight of xylene, 5.762 parts by weight of toluene, and 0.179 parts by weight of methanesulfonic acid and this initial charge is heated to 104° C. Then 80.615 parts by weight of 12-hydroxystearic acid are run into the reactor and the reaction mixture is boiled at 171° C. under reflux, with removal of the water of reaction. The reaction is at an end when an acid number of 35 is reached. After cooling, the solids is adjusted to 80 parts by weight with solvent naphtha.

1.3. Preparation of Polymer Microparticles (M)

A reactor is charged with 43.16 parts by weight of solvent naphtha, 0.08 parts by weight of N,N-dimethylcocosamine and 1.00 part by weight of ethyl acetate and this initial charge is heated to 104° C. The reactor is placed under a pressure of 0.69 bar (10 psi) and fed over the course of 2 h simultaneously with a monomer mixture consisting of 27.63 parts by weight of methyl methacrylate, 3.85 parts by weight of 2-hydroxypropyl methacrylate, 0.83 part by weight of glycidyl methacrylate, 12.81 parts by weight of the above-described carrier resin (1), 1.51 parts by weight of methacrylic acid and 1.52 parts by weight of octyl mercaptan and with an initiator mixture composed of 2.28 parts by weight of tert-butyl peroxy-2-ethylhexanoate and 5.13 parts by weight of solvent naphtha.

Subsequently, the reaction mixture is held for 3 h at the abovementioned temperature and pressure, before being cooled and adjusted with solvent naphtha to a solids of 41%. The resulting polymer microparticles have an acid number of 10 mg KOH/g and an OH number of 48 mg KOH/g, based in each case on the solids.

1.4. Preparation of the Stabilized Inorganic Particles (N)

In a receiver, 10.00 parts by weight of the acrylate binder (B) described under 1.1., 6.00 parts by weight of Degussa Aerosil® 380 (commercial hydrophilic fumed silica from Degussa AG with a specific surface area (BET) of 380 m$^2$/g, an average primary-particle size of 7 nm, and an SiO2 content of >=99.8% by weight, based on the calcined substance), 41.7 parts by weight of solvent naphtha, 41.7 parts by weight of butyl acetate and 0.6 parts by weight of a fatty acid ester stabilizer (S), with a nonvolatile fraction of 96.2% at 2 h 130° C., an OH number of 50 mg KOH/g and an acid number of 17.2 mg KOH/g, based in each case on the 130° C. solids content, containing 6-hydroxycaproic acid, hydroxyvaleric acid, lauric acid and polyethylene glycol (by way of example the commercial, fatty acid ester-based wetting additive Solsperse® 39000 from Th. Goldschmidt), are mixed and dispersed.

1.5. Preparation of a Wax Dispersion (W)

6.00 parts by weight of the polyethylene wax EVA 1 from BASF AG (commercial polyethylene wax based on an ethylene/vinyl acetate copolymer with a melting point of 87-92° C., an Ubbelohde dropping point of approximately 95° C. and a mass-average molecular weight (viscosimetric) of approximately 6500 g/mol) and 40.00 parts by weight of xylene are dissolved with slow stirring at 100° C. With further stirring, this solution is cooled to 70° C. and 54.00 parts by weight of butyl acetate (technical, approximately 85% pure) are slowly added, a desired wax precipitation beginning. With further stirring, the dispersion is cooled further down to 35° C.

1.6. Preparation of a Paste of an Aluminum Effect Pigment

The paste is prepared with stirring from 40 parts by weight of a commercial nonleafing aluminum effect pigment paste of the silver dollar type with an average particle size of 14 μm (Metallux 2192 from Eckart), 45 parts by weight of butyl glycol acetate and 15 parts by weight of the acrylate binder (B) described under 1.1.

1.7. Preparation of the Nonstabilized Inorganic Particles (NC) (Comparative)

In a receiver, 10.00 parts by weight of the acrylate binder (B) described under 1.1., 6.00 parts by weight of Degussa Aerosil® 380 (commercial hydrophilic fumed silica from Degussa AG with a specific surface area (BET) of 380 m$^2$/g, an average primary-particle size of 7 nm and an SiO2 content of >=99.8% by weight, based on the calcined substance), 41.7 parts by weight of solvent naphtha and 41.7 parts by weight of butyl acetate are mixed and dispersed.

2.1. Preparation of a Metallic Basecoat Material P1

The basecoat material P1 of the invention was prepared by mixing the following constituents in the order stated, and homogenizing the resulting mixtures:

19 parts by weight of the wax dispersion described under 1.5

18 parts by weight of the polymer microparticles (M) described under 1.3

15.0 parts by weight of the stabilized inorganic particles (N) described under 1.4

11.0 parts by weight of the binder (B) described under 1.1

13.2 parts by weight of a commercial monomeric hexamethoxymethyl melamine resin (product Maprenal® MF 900 from Surface Specialities Germany GmbH & Co. KG)

0.5 part by weight of a commercial wetting additive based on an amine resin-modified acrylic copolymer without silicone additions, having a viscosity of 150-280 mPa·s at 23° C. (cone/plate, shear rate 25 s$^{-1}$) and an active-substance content of 70% (product Additol XL 480 from Cytec Surface Specialities)

1.5 parts by weight of a commercial, acidic, amine-neutralized catalyst based on dodecylbenzenesulfonic acid (product Nacure® 5225 from King Industries Speciality Chemicals)

18 parts by weight of the aluminum effect pigment paste described under 1.6

3.8 parts by weight of butanol

The basecoat material P1 is coating-ready with a viscosity of 23 sec Ford Cup 3 and a solids content (1 h, 120° C.) of 39.8%.

2.2. Preparation of a Metallic Basecoat Material PC1 (Comparative)

The noninventive basecoat material PC1 was prepared by mixing the following constituents in the order stated, and homogenizing the resulting mixtures:

32 parts by weight of the wax dispersion described under 1.5

18 parts by weight of the polymer microparticles (M) described under 1.3

13.0 parts by weight of the binder (B) described under 1.1

13.2 parts by weight of a commercial monomeric hexamethoxymethyl melamine resin (product Maprenal® MF 900 from Surface Specialities Germany GmbH & Co. KG)

0.5 part by weight of a commercial wetting additive based on an amine resin-modified acrylic copolymer without silicone additions, having a viscosity of 150-280 mPa·s at 23° C.

(cone/plate, shear rate 25 s$^{-1}$) and an active-substance content of 70% (product Additol XL 480 from Cytec Surface Specialities)

1.5 parts by weight of a commercial, acidic, amine-neutralized catalyst based on dodecylbenzenesulfonic acid (product Nacure® 5225 from King Industries Speciality Chemicals)

18 parts by weight of the aluminum effect pigment paste described under 1.6

3.8 parts by weight of butanol

The basecoat material PC1 is coating-ready with a viscosity of 20 sec Ford Cup 3 and a solids content (1 h, 120° C.) of 42.3%.

2.3. Preparation of a Metallic Basecoat Material PC2 (Comparative)

The noninventive basecoat material PC2 was prepared by mixing the following constituents in the order stated, and homogenizing the resulting mixtures:

26 parts by weight of the polymer microparticles (M) described under 1.3

11 parts by weight of the stabilized inorganic particles (N) described under 1.4

15.0 parts by weight of the binder (B) described under 1.1

15.0 parts by weight of a commercial monomeric hexamethoxymethyl melamine resin (product Maprenal® MF 900 from Surface Specialities Germany GmbH & Co. KG)

0.5 part by weight of a commercial wetting additive based on an amine resin-modified acrylic copolymer without silicone additions, having a viscosity of 150-280 mPa·s at 23° C. (cone/plate, shear rate 25 s$^{-1}$) and an active-substance content of 70% (product Additol XL 480 from Cytec Surface Specialities)

1.5 parts by weight of a commercial, acidic, amine-neutralized catalyst based on dodecylbenzenesulfonic acid (product Nacure® 5225 from King Industries Speciality Chemicals)

18 parts by weight of the aluminum effect pigment paste described under 1.6

3.8 parts by weight of butanol

The basecoat material PC2 is coating-ready with a viscosity of 21 sec Ford Cup 3 and a solids content (1 h, 120° C.) of 40.9%.

2.4. Preparation of the Metallic Basecoat Material PC3 (Comparative)

The noninventive basecoat material PC3 was prepared in analogy to the basecoat material P1, with the sole difference that instead of 15.0 parts by weight of the stabilized particles (N) described under 1.4. 15.0 parts by weight of the nonstabilized particles (NC) described under 1.7. were used. The basecoat material PC3 is coating-ready with a viscosity of 23 sec. Ford Cup 3 and a solids content (1 h, 120° C.) of 39.6%.

2.5. Testing of Metallic Basecoat Materials P1, PC1, PC2 and PC3

The storage stability of the metallic basecoat materials P1, PC1, PC2 and PC3 was determined by storing these basecoat materials at a temperature of 40° C. for 1 week and measuring the efflux viscosity in the Ford Cup 3 at 23° C. before and after storage. The results are set out in table 1.

TABLE 1

Viscosity of the metallic basecoat materials P1, PC1, PC2 and PC3 before and after 1-week storage at a temperature of 40° C.

| Basecoat material | Viscosity before storage | Viscosity after storage |
|---|---|---|
| P1 | 23 | 23 s |
| PC1 | 20 s | 20 s |
| PC2 | 21 s | 22 s |
| PC3 | 23 s | 32 s |

3.1. Production of Multicoat Paint Systems 1, C1, C2 and C3

To test the performance properties of the basecoat materials P1, PC1, PC2 and PC3, test panels measuring 30×70 cm were produced in conventional manner. For this purpose, steel panels (bodywork panels) which had been coated with a commercially customary and known, baked, cathodically deposited electrodeposition coating (Cathoguard® 300 from BASF Coatings AG), were coated with a commercially customarily, conventional, polyester-based surfacer from BASF Coatings AG, after which the resulting surface or films were flashed off at 20° C. for 5 minutes and a relative humidity of 65% and baked at 140° C. in a forced-air oven for 30 minutes.

After the test panels had cooled to 20° C., the basecoat materials P1 or PC1 or PC2 or PC3 were applied by dual ESTA application with a dry film coat thickness of 18 μm. Subsequently the basecoat films were flashed off for 5 minutes and overcoated with the commercial one-component clearcoat material Uregloss® from BASF Coatings AG, with a dry film coat thickness of 45 μm. After that the basecoat films and the clearcoat films were baked at 140° C. for 10 minutes, giving the inventive multicoat effect paint system of example 1 and the noninventive multicoat paint systems of comparative examples C1, C2 and C3.

3.2. Testing of the Resultant Multicoat Paint Systems 1, C1, C2 and C3

The multicoat paint systems 1, C1, C2 and C3 were subjected to measurement using a spectralphotometer from X-Rite (e.g., MA48 Multi-Angle Spectrophotometer). From the brightness values determined for the two multicoat paint systems at viewing angles of 15° C., 45° C. and 110° C., it is possible to calculate the X-Rite flop index in accordance with the following formula:

$$FL_{X\text{-}Rite}=2.69(L^*_{15°}-L^*_{110°})^{1.11}/(L^*_{45°})^{0.86}.$$

The multicoat paint system 1 and the multicoat paint systems C1, C2 and C3 each gave an $FL_{X\text{-}Rite}=12$. The metallic flop was therefore very well pronounced for all of the coatings.

In addition, gloss and haze (20°) were determined in accordance with DIN 67530 and the flow was determined using the Byk/Gardner wave scan plus instrument (longwave=LW; shortwave=SW). The cracking was assessed visually. The results of measurement are given in table 2.

The results compiled in table 2 underline the fact that the multicoat paint system of the invention exhibited an outstanding flop effect, accompanied by a very slight sparkle effect, if any at all. This resulted in color metallic effects with a very elegant visual impression. Essentially no clouds were observed. Gloss, haze and leveling were likewise outstanding. In particular, the multicoat paint system of the invention showed no cracking in the basecoat.

TABLE 2

Test results of multicoat paint systems 1, C1, C2 and C3

| Ex. | $FL_{X\text{-}Rite}L^*_{15°}$ | Gloss | Haze | Cracking | Longwave | Shortwave |
|---|---|---|---|---|---|---|
| 1 | 12 | 91 | 11 | None | 10 | 25 |
| C1 | 12 | 89 | Cracks | Cracks | 14 | 39 |
| C2 | 12 | 90 | 42 | None | 12 | 35 |
| C3 | 12 | 90 | 12 | None | 11 | 24 |

In addition, the appearance of visual defects, particularly the appearance of sanding marks, was tested on the multicoat paint systems 1, C1, C2 and C3, as follows:

Both a round and a circular sanding point were applied to the test panels using sandpaper from Plochmann with a grade of 800-1000. These sanding points were coated with the basecoat materials P1 or PC1 or PC2 or PC3 and the clearcoat material described in 3.1., and were dried as described in 3.1. The respective difference in shade was assessed visually. In addition, the clouding was assessed visually as well. The results obtained are set out in table 3.

Key to Ratings:
1 defects or clouds not visible
2 defects or clouds very slightly visible
3 defects or clouds slightly visible
4 defects or clouds markedly visible
5 defects or clouds very markedly visible

TABLE 3

Assessment of visual defects and clouds

| Example | Sanding marks, rating | Clouds |
|---|---|---|
| 1 | 2 | 2 |
| C1 | 3 | 3 |
| C2 | 3 | 3 |
| C3 | 2 | 2 |

What is claimed is:

1. A pigmented coating composition (P) comprising:
   one or more inorganic particles (N) which have a particle size of 1 to 800 nm,
   one or more binders (B),
   one or more pigments,
   one or more organic solvents (E),
   at least one wax and/or at least one waxlike compound (W),
   optionally, one or more crosslinking agents (V), and
   at least one effect pigment,
   wherein the inorganic particles (N) are at least partly modified with a stabilizer (S) comprising at least one group (S1) able to interact with the surface of the inorganic particles (N), and one or more hydrophobic substructures, wherein the groups (S1) of the stabilizer are selected from the group consisting of hydroxyl, carboxyl, ether, phosphate, phosphonate, bisphosphonate, sulfate, sulfonate, nitrogen-containing hydrophilic groups and mixtures thereof, wherein the stabilizer (S) comprises esters of fatty acids and/or esters of dimer fatty acids and/or esters of trimer fatty acids.

2. The pigmented coated composition (P) of claim 1, wherein the wax and/or waxlike compound (W) comprises at least one of modified and/or unmodified polyolefin waxes, polyethylene waxes, polypropylene waxes, polyethylene glycol waxes, polyamine waxes, polyacrylate polymers, polyacrylate copolymers, and mixtures thereof.

3. A pigmented coating composition (P) comprising:
   one or more inorganic particles (N) which have a particle size of 1 to 800 nm,
   one or more binders (B),
   one or more pigments,
   one or more organic solvents (E),
   at least one wax and/or at least one waxlike compound (W),
   optionally, one or more crosslinking agents (V), and
   at least one effect pigment,
   wherein the inorganic particles (N) are at least partly modified with a stabilizer (S) comprising at least one group (S1) able to interact with the surface of the inorganic particles (N), and one or more hydrophobic substructures, wherein the groups (S1) of the stabilizer are selected from the group consisting of hydroxyl, carboxyl, ether, phosphate, phosphonate, bisphosphonate, sulfate, sulfonate, nitrogen-containing hydrophilic groups and mixtures thereof, wherein the hydrophobic substructures are selected from the group of the radicals of saturated and/or unsaturated fatty acids having 5 to 30 carbon atoms in the molecule.

4. The pigmented coating composition (P) of claim 3, wherein the stabilizer (S) comprises esters of fatty acids and/or esters of dimer fatty acids and/or esters of trimer fatty acids.

5. The pigmented coating composition (P) of claim 1, wherein the inorganic particles (N) are selected from the group consisting of silica, alumina, and mixtures thereof.

6. The pigmented coating composition (P) of claim 1, comprising at least one of the following
   the particles (N) in an amount of 0.2% to 2.0% by weight,
   the wax and/or the waxlike compound(s) (W) in an amount of 0.2% to 2.0% by weight,
   the stabilizer (S) in an amount of 3% to 40%,
   and mixtures thereof,
   wherein the amounts of (N) and (W) are based in each case on the total weight of the pigmented coating composition and on the solids content of the components (N) and (W),
   and based on the weight of component (N) without the stabilizer (S); and further wherein the amount of (S) is based on the weight of the particles (N) and based on the solids content of the stabilizer (S) and of the particles (N).

7. The pigmented coating composition (P) of claim 1, wherein the particles (N) and the compound(s) (W) are used in amounts such that the total amount of inorganic particles (N) plus wax and/or waxlike compound (W) is from 0.4% to 4.0%, based in each case on the total weight of the pigmented coating composition and based on the solids content of this component (W) and of the particles (N) without stabilizer.

8. The pigmented coating composition (P) of claim 1, wherein the particles (N) and the wax and/or the compound(s) (W) are used in amounts such that the weight ratio of the inorganic particles (N) without stabilizer (S) to the compound (W), in each case based on the solids content of these components (N) and (W), is between 70:30 and 30:70.

9. The pigmented coating composition (P) of claim 1, further comprising polymer microparticles (M), in an amount of 3% to 25% by weight, based in each case on the solids content of the coating composition (P) and on the solids content of the polymer microparticles (M).

10. The pigmented coating composition (P) of claim 1, wherein the solids content is at least 35% by weight and wherein the coating composition (P) has a viscosity at 23° C. of 16 s to 35 s, as the efflux time in the Ford Cup 3.

11. An effect or effect and color paint system comprising at least one pigmented coating, wherein the pigmented coating has been produced from the coating composition (P) of claim 1.

12. A process for producing the paint system of claim 11, comprising applying the one pigmented coating (P) of claim 1 to a substrate.

13. The process of claim 12, wherein the substrate is at least one of an automotive OEM finishing substrate, a utility-vehicle finishing substrate, a refinishing substrate, an interior or exterior bodywork component, a component for marine engineering, a component for aircraft engineering, a component for household appliances, and a component for electrical appliances.

14. A method of enhancing the flop of an effect paint system, comprising
   I. applying a solventborne pigmented coating composition to a substrate,
   II. forming a film from the coating composition applied in I),
   III. optionally, applying a transparent coating composition to the film formed from I), and
   IV. curing the pigmented and, where appropriate, the transparent coating composition either separately or together to give a cured film on the substrate,
   wherein the pigmented coating composition comprises at least one effect pigment, one or more binders (B), one or more organic solvents (E), optionally, at least one or more crosslinking agents (V), at least one wax and/or one waxlike compound (W) and one or more inorganic particles (N) comprising a particle size of 1 to 800 nm, the inorganic particles (N) being at least partly modified with a stabilizer (S) which has at least one group (S1) which is able to interact with the surface of the inorganic particles (N), and one or more hydrophobic substructures, wherein the groups (S1) of the stabilizer are selected from the group of hydroxyl, carboxyl, ether, phosphate, phosphonate, bisphosphonate, sulfate, sulfonate, nitrogen-containing hydrophilic groups, and mixtures thereof, wherein the hydrophobic substructures are selected from the group of the radicals of saturated and/or unsaturated fatty acids having 5 to 30 carbon atoms in the molecule.

15. The pigmented coating composition (P) of claim 1 wherein the inorganic particles (N) have a particle size of 3 to 250 nm.

16. The pigmented coating composition (P) of claim 3 wherein the hydrophobic substructures are selected from the group of hydroxyvaleric acid, hydroxycaproic acid, hydroxystearic acid, hydroxylauric acid, and mixtures thereof.

17. The pigmented coating composition (P) of claim 1, wherein the stabilizer (S) comprises esters of fatty acids and/or esters of dimer fatty acids and/or esters of trimer fatty acids with polyalkylene glycols having 6 to 20 C atoms.

18. The pigmented coating composition (P) of claim 1, wherein the effect pigment comprises a metal flake pigment or a nonmetallic effect pigment selected from the group consisting of pearlescent pigments, interference pigments, plated-shaped effect pigments based on iron oxide, liquid-crystalline effect pigments, and combinations thereof.

* * * * *